March 25, 1941.  F. L. McKENNA  2,236,439
CLAMP
Filed April 4, 1940  2 Sheets-Sheet 1
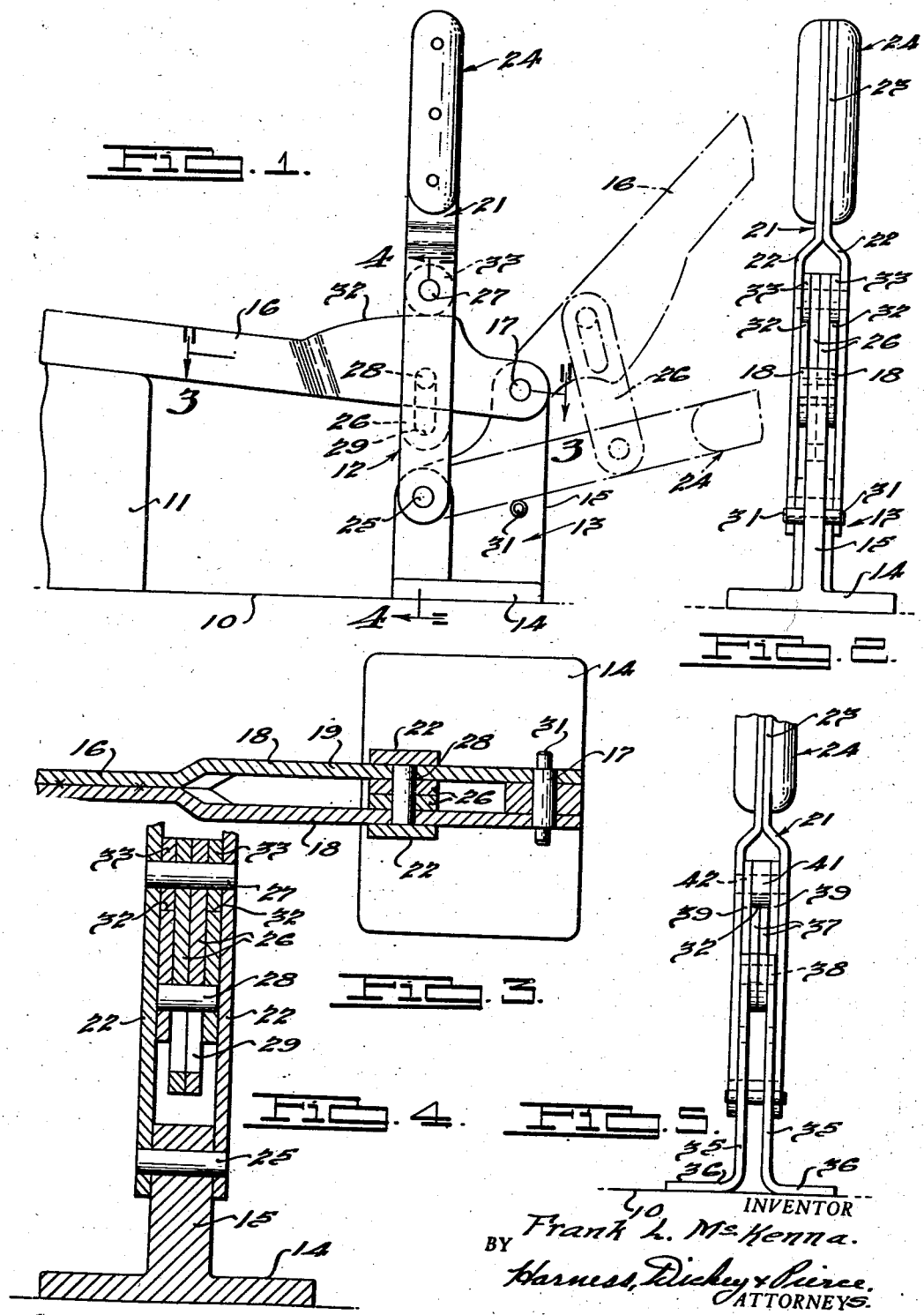
INVENTOR
Frank L. McKenna.
BY Harness, Dickey & Pierce.
ATTORNEYS.

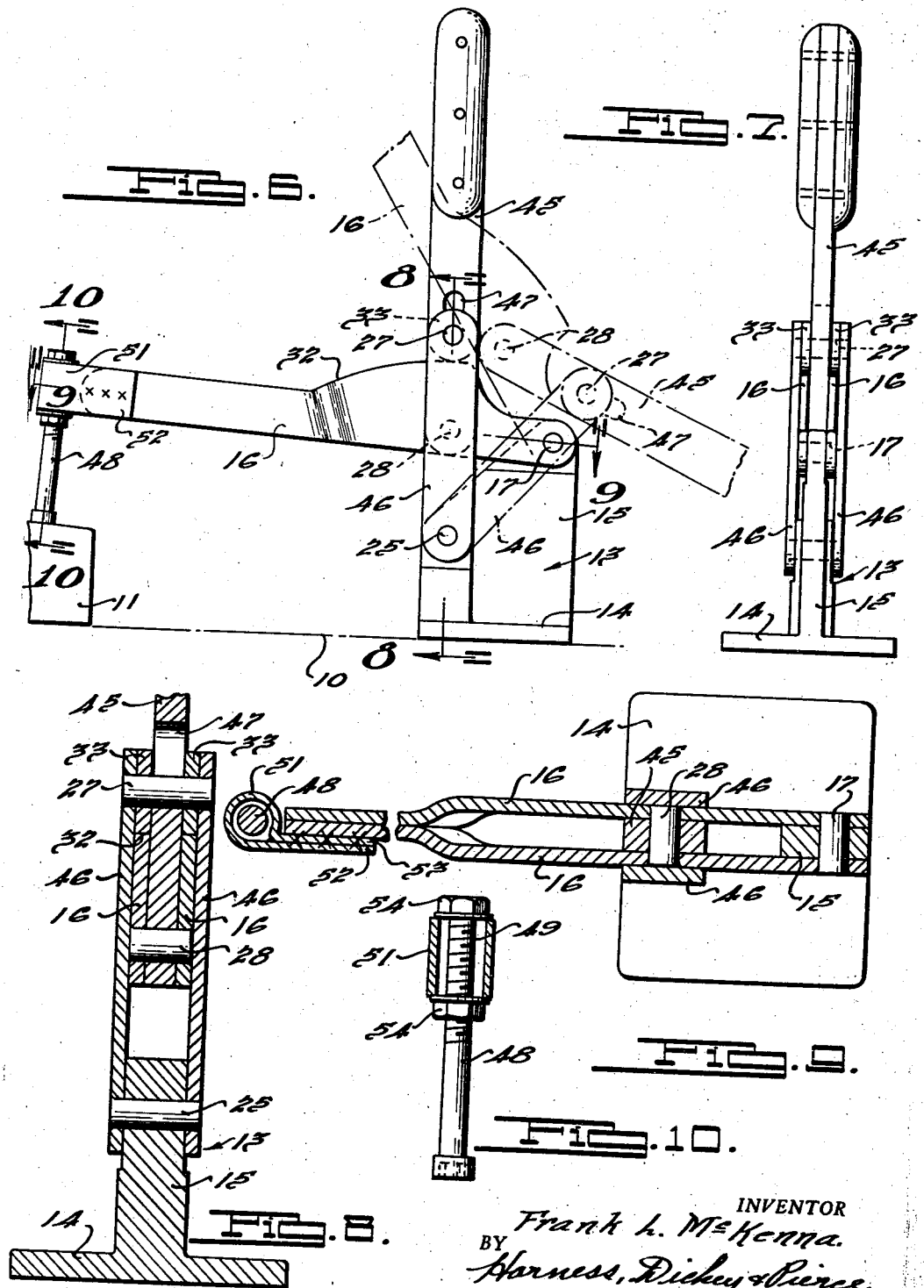

Patented Mar. 25, 1941

2,236,439

UNITED STATES PATENT OFFICE 2,236,439

CLAMP

Frank L. McKenna, Detroit, Mich.

Application April 4, 1940, Serial No. 327,928

6 Claims. (Cl. 144—290)

My invention relates to clamps, and particularly to a clamp having a work engaging arm which is cam actuated to work clamping position.

The clamp is provided with a standard to which a work engaging arm is pivoted. The arm is moved to and from engagement with the workpiece by an operating arm also pivoted on the standard. Clamps of this type, employed heretofore in the art, utilized a link for interconnecting the operating and work engaging arms in a manner to form a toggle which secured the arm in clamped relation. The fact that the work engaging arm is held in a single position by the toggle relation of the elements renders this clamp objectionable.

In my present invention I provide a cam surface on the work engaging arm and a roller on the operating arm, engageable with the cam surface. The cam surface may be an Archimedes curve or of other suitable formation, one which permits a variation in the height of the arm while maintained in locked position. A slotted link interconnects both of the arms, the link being pivoted by a pin to the operating arm, with the slot thereof projecting over the pin in the work engaging arm. The slot permits independent movement of the arms while providing means whereby the working arm may be moved completely out of engagement with the workpiece.

Accordingly, the main objects of my invention are; to provide a clamp for a workpiece with an arm which has a range of clamping positions; to provide a work engaging arm with a cam surface and an operating arm with a roller so related as to provide a variation in clamping height while maintained in locked relation; to provide a clamp with a work engaging arm having a cam surface and an operating arm having an engaging roller interconnected by a slotted link; to provide a clamp with a web to which bifurcated work engaging and operating arms are pivoted and so interconnected by a link that a roller on the operating arm is engageable with a cam surface on the work engaging arm; and in general, to provide a clamp which is simple in construction, positive in operation, and economical of manufacture.

Other objects and features of novelty of my invention will be either specifically pointed out or will become apparent when referring, for a better understanding of my invention, to the following description taken in conjunction with the accompanying drawings, wherein:

Figure 1 is a view in side elevation of a clamp embodying features of my invention;

Fig. 2 is an end view of the structure illustrated in Fig. 1;

Fig. 3 is an enlarged broken sectional view of the structure illustrated in Fig. 1, taken on the line 3—3 thereof;

Fig. 4 is an enlarged broken sectional view of the structure illustrated in Fig. 1, taken on the line 4—4 thereof; and, Fig. 5 is a view of structure, similar to that illustrated in Fig. 2, showing a modified form of my invention;

Fig. 6 is a view in elevation of structure similar to that illustrated in Fig. 1, showing a further modified form of my invention;

Fig. 7 is an end view of the structure illustrated in Fig. 6;

Fig. 8 is an enlarged broken sectional view of the structure illustrated in Fig. 6, taken on the line 8—8 thereof;

Fig. 9 is an enlarged, broken sectional view of the structure shown in Fig. 6, taken on the line 9—9 thereof; and, Fig. 10 is an enlarged sectional view of the structure illustrated in Fig. 6, taken on the line 10—10 thereof.

The clamp which embodies my present invention is of the type having a base which is attached adjacent to a work support with the work engaging arm in position to engage and hold the workpiece against its support. In the figure, I have illustrated a work supporting base 10 having a workpiece 11 placed in position to be engaged by the arm of the clamp 12. The clamp 12 comprises a standard 13 having a base 14 and an upwardly extending central web 15. A work engaging arm 16 is pivoted to the web 15 on a pivot 17. The arm 16 is preferably constructed of a pair of stampings 18 which are offset to provide a bifurcated end portion 19 when the outer end portions are welded together as illustrated in Fig. 3.

An operating arm 21 is likewise made of a pair of stampings 22 which are offset to provide a bifurcated end portion extending from the joined portion 23 forming the handle 24. The ends of the operating arm 21 are pivoted to the web 15 on the pivot 25. A link 26, made from a pair of stampings, is disposed between the elements 22 of the bifurcated portion of the operating arm and between the stampings 18 of the bifurcated portion 19 of the work engaging arm 16. The link is pivoted to the operating arm on the pivot 27 and is secured to the work engaging arm by the pin 28 disposed in a slot 29 of the link. When the operating arm is moved away from the workpiece, the link engages the pin 28 and operates the work engaging arm 16 away from the workpiece. The operating arm is limited in this movement by a pin 31.

The work engaging arm 16 is provided with cam surfaces 32 engageable by rollers 33 which are mounted on the pin 27 between the link 26 and the bifurcated portion of the operating arm 21. The shape of the cam surface may vary, but I have found that a cam surface having the shape of an Archimedes curve provides locking relation between the rollers 33 and the work engaging arm. The relationship between the cam surface and rollers should be such that a positive lock is provided while the work engaging arm is moved to engage and clamp the workpiece. As mentioned hereinabove, the use of a toggle link for locking the work engaging arm in position limits the clamp to one locking position. The feature of moving the work engaging arm by the link pivoted to the operating arm is the same in my present clamp as in the toggle actuated clamp. The additional feature of providing the work engaging arm with various clamping positions is incorporated in my clamp.

While I have illustrated and described a clamp having the arms mounted on a standard having a single web 15 extending from the base support, I have shown in Fig. 5, the application of my principle to a clamp employing a pair of spaced webs 35 projecting from supporting flanges 36. In this construction, the operating arm 37 is formed of two stampings which are welded together throughout their length and disposed between the webs 35 and pivoted on a pin 38. The pair of links 39 are disposed outside of the arm 37 and are attached to the operating arm 21 by a pin 42. A roller 41 is disposed between the links and is also mounted on the pin 42. The opposite ends of the links 39 are slotted and pivoted to the work engaging arm 37 as illustrated in Fig. 1. The roller engages the cam surfaces 32 on the arm 37 and functions in a manner as set forth hereinabove for clamping the workpieces to the base 10.

In Fig. 6, I have illustrated a further form of my invention, that wherein the handle 24 is changed to form an extension of the links 26 of the structure illustrated in Fig. 1. That is to say, a handle 45 is pivoted on the pivot 28 of the arm 16 while a pair of links 46 are pivoted on the pin 25 to the frame casting 13. The pin 27 carries the rollers 33 and extends through a slot 47 in the handle 45. The advantage of this construction resides in the toggle lock provided by the links 46 and the pivot of the handle 45 as the rollers are advanced along the curved surface 32. The lock formed in this manner prevents the reverse movement of the rollers on the cam which might release the clamp from the work.

I have illustrated an adjustable workpiece engaging stud 48 attached to the arm 16 of Fig. 6, and it is to be understood that a similar stud may be attached to the arm 16 in the structures illustrated in the prior figures. The stud has a threaded end 49, which extends through a collar 51 formed by a strap having extending legs 52 and 53 disposed in off-center relation to the collar. When welded or otherwise secured to the end of the arm 16, the stud will be on the longitudinal center line of the arm. A pair of nuts 54 retain the stud 48 in adjustable position on the end of the arm. Preferably, the element constituting the collar and extending legs is furnished separate with the clamp so that after the clamp 5 and workpiece is located, the collar may be welded to the end of the arm in required position.

It will thus be seen that I have provided a clamp having a work engaging arm which is movable into and out of engagement with the workpiece by means of a link, and which engages and clamps the work through the action of a roller on a cam surface provided on the arm. The arm may be bifurcated and secured to a support having a single web or a unit arm may be provided disposed between a pair of projecting webs employing a single roller in contact with the cam surface thereof. In either construction, the main novelty of the invention resides in the variation in the positions of the work engaging arm which is maintained locked in all of the said positions.

While I have described and illustrated several embodiments of my invention, it will be apparent to those skilled in the art that various changes, omissions, additions and substitutions may be made therein without departing from the spirit and scope of my invention, as set forth in the accompanying claims.

What I claim is:

1. A clamp including, in combination, a standard, a work engaging arm pivoted thereon and provided with a cam surface, an operating arm pivoted on said standard, a link pivoted on said operating arm and having a slot and pin connection with said work engaging arm, and a roller on said operating arm engageable with said cam surface.

2. A clamp including, in combination, a standard having a base and an upwardly projecting web, a work engaging arm having a bifurcated end portion pivoted to said web, a bifurcated operating arm pivoted to said web, a link interconnecting the bifurcated portions of said arms whereby the movement of the operating arm causes a similar movement of the work engaging arm, said work engaging arm having a cam surface, and means on said operating arm engaging said cam surface for clamping said arm.

3. A clamp including, in combination, a standard having a base and an upstanding web, a work engaging arm having bifurcated end portions pivoted to said web, an operating arm having bifurcated end portions pivoted to said web, a link pivoted to the bifurcated portion of said operating arm, said link having a slot therein, a pin projecting through said slot and supported on said bifurcated portion of the work engaging arm, cam surfaces on the bifurcated portion of said work engaging arm, and rollers on said operating arm engageable with said surfaces when the work engaging arm is in clamped position.

4. A clamp comprising a pair of angle elements disposed in spaced relation, one branch forming secure feet, the other branch providing upstanding webs, a work engaging arm disposed between said webs and pivoted thereto, an operating arm having a bifurcated portion receiving said webs and pivoted thereto, a pair of links spanning said work engaging arm and disposed between the bifurcated portion of said operating arm and pivoted thereto, said links being provided with a slot, a pin projecting into the slots and through said work engaging arms, said work engaging arms having a cam surface, and a roller disposed between said links on the pivot thereof engageable with said cam surface when a workpiece is clamped.

5. A clamp including, in combination, a standard, a work engaging arm pivoted thereon provided with a cam surface, an operating arm pivoted on said work engaging arm, a link pivoted on said standard and having a slot and pin connection with said operating arm, and rollers on said last pin engageable with said cam surface.

6. A clamp including, in combination, a standard, a work engaging arm pivoted thereon and provided with a cam surface, an operating arm pivoted on said work engaging arm and provided with a slot, a link pivoted on said standard, a pin on said link extending through the slot in said operating arm, a roller pivoted on said last pin disposed in position to engage said cam surface and to be locked in adjusted position by said link.

FRANK L. McKENNA.